UNITED STATES PATENT OFFICE.

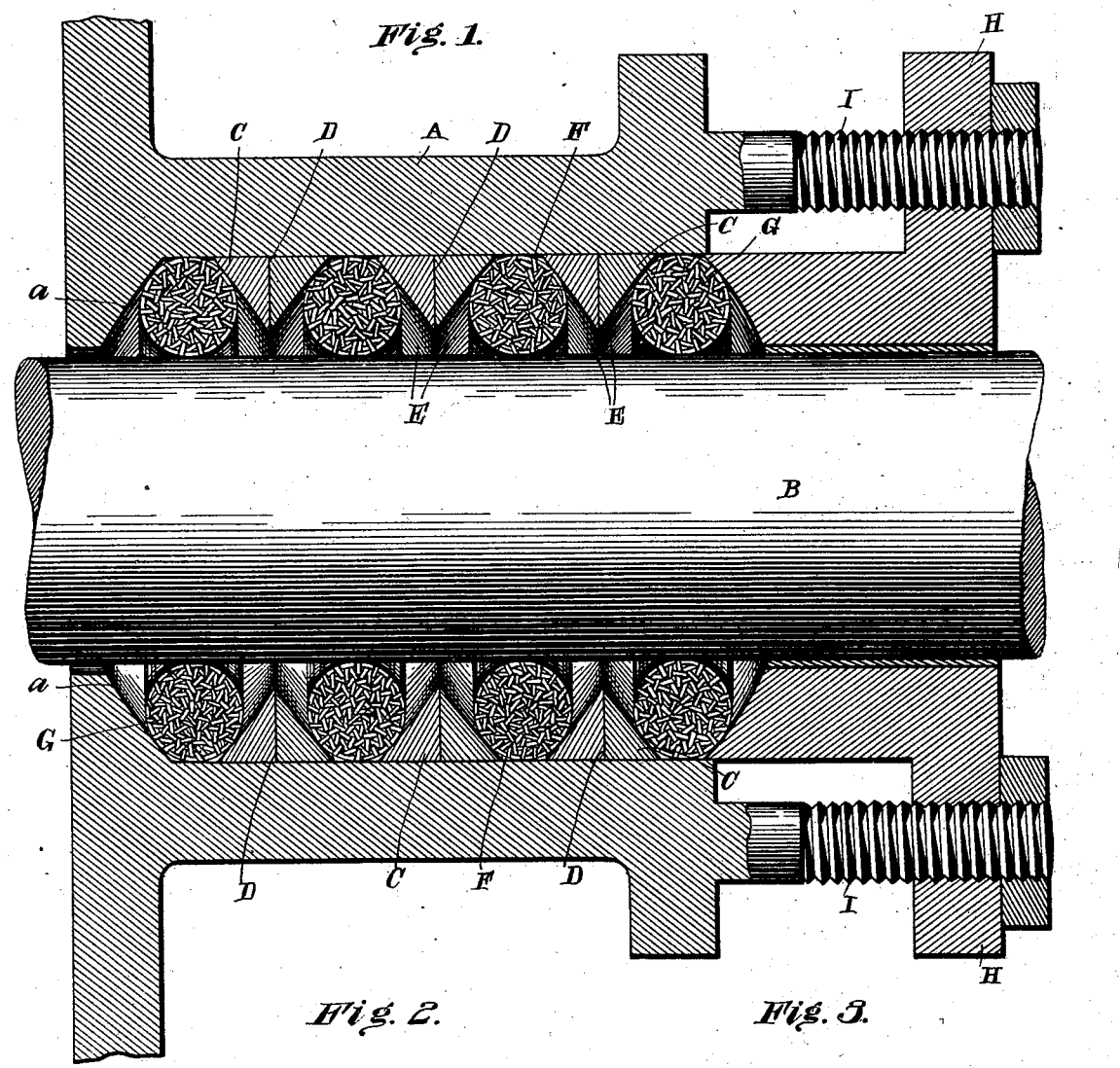

ALDEN BRADFORD, OF FALL RIVER, MASSACHUSETTS.

ROD-PACKING.

SPECIFICATION forming part of Letters Patent No. 501,913, dated July 25, 1893.

Application filed November 9, 1892. Serial No. 451,454. (No model.)

*To all whom it may concern:*

Be it known that I, ALDEN BRADFORD, a citizen of the United States, residing at Fall River, in the county of Bristol and State of Massachusetts, have invented a new and useful Rod-Packing, of which the following is a specification.

This invention relates to rod packing; and it has for its object to provide an improvement in metallic packing for piston and valve rods for steam and other engines, which while having the necessary anti-friction qualities, at the same time provides a packing which insures a constant and positive steam joint while serving the other necessary functions of packing.

To this end the invention primarily contemplates a simple and efficient packing for piston and other moving rods.

With these and other objects in view which will readily appear as the nature of the invention is better understood, the same consists in the novel construction, combination and arrangement of parts hereinafter more fully described, illustrated and claimed.

In the accompanying drawings:—Figure 1 is a sectional view of a stuffing box in which is arranged packing constructed in accordance with this invention. Fig. 2 is a detail in perspective of one of the packing rings. Fig. 3 is a similar view of one of the packing rings.

Referring to the accompanying drawings:— A represents a stuffing box having an inner beveled shoulder a, against which is clamped the inner end of the packing herein described, and said stuffing box accommodates the piston or valve rod B, which reciprocates therethrough.

Arranged at regular intervals apart within the stuffing box A are pairs of split clamping rings C, which rings fit out against the inner sides or walls of the stuffing box and are out of contact with the rod moving therein. The clamping rings C, of each pair are provided with flat registering faces D, meeting the corresponding face of the adjacent ring and with the opposite interior beveled faces E. The beveled faces of the rings of the adjacent pairs form therebetween intermediate clamping spaces F, in which, between said rings are clamped the alternately arranged "fagot" packing rings G. The clamping rings C, are of suitable composition metal, such as Babbitt's metal or other similar hard alloy while the packing rings G, each comprise a compact bundle of small continuous strips of anti-friction metal, such as lead or a soft alloy thereof which are closely bunched together as illustrated to form a "fagot" packing ring (which properly describes the construction) which as formed, are truly circular in cross sections and are adapted to always be in contact with the rod B. The innermost fagot ring G is clamped between the innermost of the clamping rings C, and the inner beveled shoulder a, of the stuffing box, while the outermost of said packing rings is clamped between the outermost of the clamping rings and the gland H, arranged to work in the outer end of the stuffing box and adjustably clamped thereto on the bolts I. Now, from the construction herein described it will be observed that the alternate pairs of clamping rings have their inner edges always out of contact with the reciprocating rod B, and therefore under the pressure from the gland H serve to crowd the bunched or fagot packing rings tightly onto the rod, while at the same time the clamping rings themselves are forced out against the walls of the stuffing box to form a steam joint therewith. As the rings G, wear out, it will be readily seen that the same can be always clamped tight onto the rod B, by adjusting the stuffing box, and on account of the "fagot" construction of such rings a much better contact is made with the rod, while at the same time making a perfectly steam tight joint therewith.

By reference to the drawings it will be seen that the fagot packing rings are split so that they can be adjusted onto the rod in the ordinary manner, but in the present invention such rings are not inclosed within any auxiliary covering, and it is partly due to this fact that the same have especial efficiency for steam packing purposes. The multiplicity of strips comprising each of the rings, are crowded onto the rod so that a large surface is efficiently packed, whereas smooth and homogeneous rings, or bunch rings covered, cannot secure the same practical results.

It is to be understood that changes in the form, proportion and the minor details of construction may be resorted to without departing from the principle or sacrificing any of the advantages of this invention.

Having thus described my invention, what I claim, and desire to secure by Letters Patent, is—

1. In a metallic rod packing, the combination of a series of circular split sectional rings having inner beveled or concaved faces disposed toward each other said rings being adapted to fit out against the inner sides of a stuffing box and to be out of contact with the rod therein, and a series of fagot anti-friction packing rings comprising compact circular bunches adapted to be clamped between the beveled faces of the rings, substantially as set forth.

2. In a metallic rod packing, the combination with a series of clamping rings out of contact with the rod; of a series of uncovered fagot packing rings arranged between the clamping rings and held onto the rod thereby, each of said fagot packing rings comprising a compact bundle of small continuous fibers or strips of anti-friction metal closely bunched together to form a ring truly circular in cross section, and having their ends terminating short of each other to form a split ring capable of adjustment on the rod, substantially as set forth.

3. In a rod packing, the combination with the stuffing box and gland thereof; of a series of adjacent pairs of split clamping rings, the rings of each pair having flat registering faces and opposite beveled faces closely meeting each other disposed toward the corresponding face of the ring of the adjacent pair, said clamping rings being adapted to fit out against the inner sides of the stuffing box and circular fagot packing rings of continuous strips of anti-friction metal clamped between the beveled faces of the several pairs of clamping rings, said clamping rings being out of contact with the rod, substantially as set forth.

In testimony that I claim the foregoing as my own I have hereto affixed my signature in the presence of two witnesses.

ALDEN BRADFORD.

Witnesses;
GEORGE E. BUMFORD,
HENRY H. EARL.